Jan. 17, 1928.
A. H. PALMBUSH
1,656,603
DITCH FILLER AND LEVEE LEVELER
Filed Feb. 18, 1927
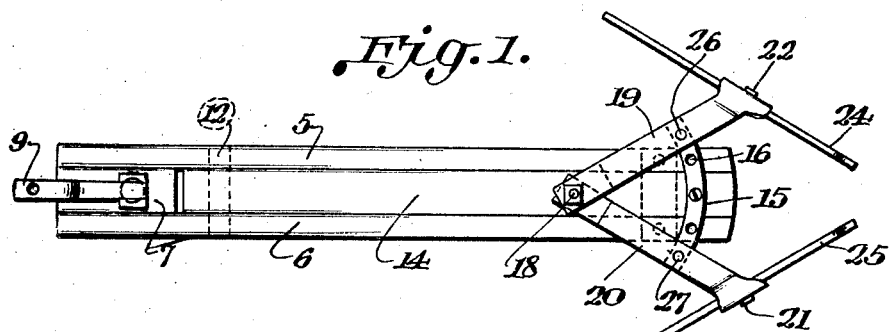
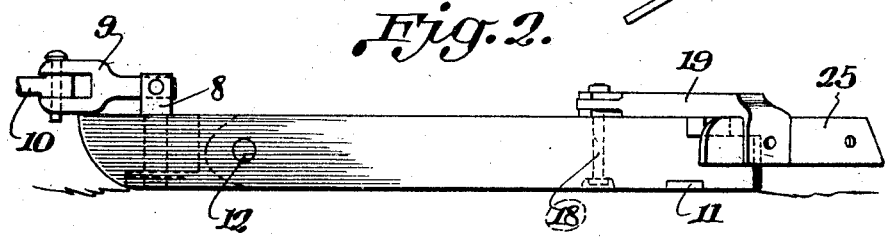
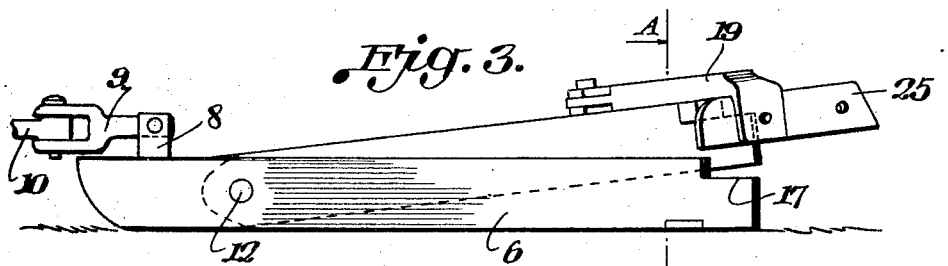
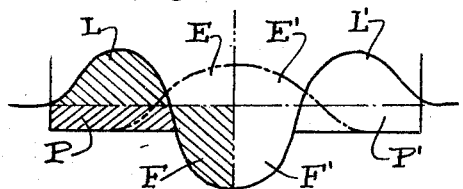
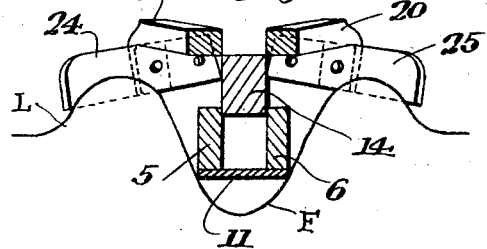
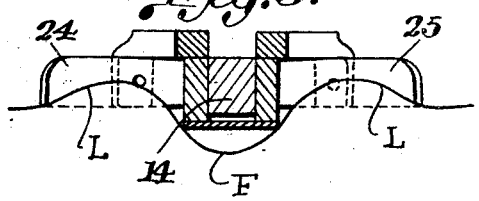
Inventor
Andrew H. Palmbush
By John A. Firmin
his Attorney Patented Jan. 17, 1928.

1,656,603

UNITED STATES PATENT OFFICE.

ANDREW H. PALMBUSH, OF CONRAD, MONTANA.

DITCH FILLER AND LEVEE LEVELER.

Application filed February 18, 1927. Serial No. 169,293.

This invention relates to an improvement in ditch fillers and has for an object to provide a device particularly adapted for use in filling ditches which have been cut through fields for irrigation purposes in which side walls or levees are provided so as to maintain the water level therein above the surface of the surrounding field.

An object of the invention is to provide such a device in a form which is simple and of few parts and adapted to be placed in and follow the irrigation ditch without special attention.

A further object is to provide with such a drag, means which will cut the levees, adjusting themselves to various heights of the levees, and leveling them to the surface of the surrounding field.

A further object is to provide means whereby the lateral extent of the cut of the leveling means may be adjusted to suit varying conditions of the soil and varying widths of the levees.

With these and other objects in view as may become apparent as the disclosure proceeds, the invention consists in the novel combination of elements, construction and arrangement of parts, operation and specific features to be hereinafter enlarged upon and recited in the subjoined claims, the invention being illustrated in the accompanying drawings, wherein:

Figure 1 is a plan view of my device showing the levee cutting members at approximately thirty degrees to the path of the drag;

Figure 2 is a side elevation showing the approximate lowest level of the cutting members;

Figure 3 is a side elevation showing the central floating member in a raised position;

Figure 4 is a diagram illustrating the use of the device;

Figure 5 is a section on the Line A—B showing the device in a shallow ditch and illustrating the cutting wings at soil level; and Figure 6 is a section on the same Line A—B showing the drag in the ditch and the wings in operation on the side levees.

Referring to the drawings side members 5 and 6 are spaced at their forward end by a spacing block 7 carrying a pivot post 8 in which is mounted a clevis-holding jaw 9 to which the clevis 10 may be attached. At the rear the side members are spaced by a cross piece 11 secured thereto.

Pivoted at 12 between the side members is a freely floating member 14 carrying at its rear end an arcuate member 15 secured thereto and provided with apertures 16. This arcuate member is seated flush with the top surface of the floating member and the side members are cut away as shown in Figure 3 at 17 so that the arcuate member may seat therein.

At the center of the arc a bolt 18 is secured in the floating member and radial arms 19 and 20 reach from the bolt to extend beyond the sides and end of the drag and terminate in securing means, as pins 21 and 22 for the scraper blades 24 and 25. These blades are laterally adjustable on the arc and are secured in position by pins 26 and 27 through the apertures 16 in the arc.

While not necessarily limited to any specific size it has been found that a drag made up of side members of approximately two inches by six inches with a central floating member of approximately four inches by six inches and of any convenient length provides a structure which adapts itself particularly well to irrigation ditches which are plow formed and commonly used in many localities.

In Figure 4 a section of a typical irrigation ditch is shown with the levees thrown up on both sides of the ditch. In leveling such a ditch with a plow it is necessary to plow both sides of the ditch to throw the dirt into the opening and as it is necessary to sink the plow sufficiently to provide a landside to maintain the plow against the action of the mold board in displacing the levee, a portion P on one side of the ditch and one portion P' on the other side of the ditch is necessarily displaced from and below the surrounding level and added to the material L and L' from the levees when these are plowed into the ditch. The material L when it is returned to the ditch fills the space F from which it was removed in the first place and the material L' similarly occupies its space F' so that the added materials from the spaces P and P' are normally piled up to occupy the spaces E and E' above the ditch, thus leaving a single ridge and a hollow on each side to interfere with the progress of reaper and binder in cutting the grain from the irrigated field. This effect is obviated by the present device as illustrated by Figures 5 and 6 in which the levee slicing attachment cuts and drags the levee from the sides of the ditch, the blades having but a portion of their extent operating upon the levee when the ditch is deep and the levees are high and presenting their entire length of cutting edge across the levee to the level of the soil beyond to leave a smooth-cut and level field.

While in the foregoing I have described specific embodiments and mentioned only certain modifications it will be appreciated that in practice I do not limit myself to such specific details as herein set forth, but may resort to any practical modifications falling within the scope of the claims.

What I claim is:

1. A ditch filler comprising spaced side members adapted to follow the ditch, a central floating member carrying ditch side scraping means, and means to limit the downward movement of said scraping means.

2. A ditch filler comprising spaced side members adapted to follow the ditch, a central floating member carrying ditch side scraping means, and means to adjust the lateral extent of cut of said scraping means.

3. A ditch filler comprising spaced side members adapted to follow the ditch, a central floating member carrying ditch side scraping means, means to limit the downward movement of said scraping means, and means to adjust the lateral extent of cut of said scraping means.

In testimony whereof I affix my signature.

ANDREW H. PALMBUSH.